(12) United States Patent
Chen

(10) Patent No.: US 9,272,375 B2
(45) Date of Patent: *Mar. 1, 2016

(54) MANUFACTURING PROCESS OF A FOLDABLE REPAIRING TOOL BIT

(71) Applicants: WINRIDE INTERNATIONAL CO. LTD., Taichung (TW); Ying-Chang Chen, Taichung (TW); Tuo-Jen Chen, Taichung (TW)

(72) Inventor: Tuo-Jen Chen, Taichung (TW)

(73) Assignees: Winride International Co., Ltd., Taichung (TW); Ying-Chang Chen, Taichung (TW); Tuo-Jen Chen, Taichung (TW)

(*) Notice: Subject to any disclaimer, the term of this patent is extended or adjusted under 35 U.S.C. 154(b) by 399 days.

This patent is subject to a terminal disclaimer.

(21) Appl. No.: 13/657,869

(22) Filed: Oct. 23, 2012

(65) Prior Publication Data

US 2014/0109726 A1    Apr. 24, 2014

(51) Int. Cl.
*B23P 15/00* (2006.01)

(52) U.S. Cl.
CPC .................................. *B23P 15/00* (2013.01)

(58) Field of Classification Search
CPC ....... B23P 15/00; B26B 11/00; B26B 11/001; B26B 23/00; B25B 23/16; B25B 15/008; B25B 15/00; B25G 1/08; B25G 1/085; B25G 1/066; B25F 1/04
USPC ........... 76/119, 108.1, 108.6, 101.1; 408/211, 408/213, 212, 225, 226, 227, 228; 30/261, 30/123, 155, 164, 161; 81/489, 177.4, 81/490, 440, 437, 438, 439, 124.5, 177.6, 81/177.1, 3.09, 3.45, 180.1, 184; 7/167, 7/168, 156, 155, 138, 128, 118, 100, 136, 7/166; 206/373–379; D8/85, 105, 99, 58, D8/55

See application file for complete search history.

(56) References Cited

U.S. PATENT DOCUMENTS

| | | | | |
|---|---|---|---|---|
| 647,528 | A * | 4/1900 | Schmidt | 81/490 |
| 2,372,612 | A * | 3/1945 | Stogsdill | 175/421 |
| 4,037,494 | A * | 7/1977 | Hess | 76/115 |
| 5,146,815 | A * | 9/1992 | Scott, III | 81/437 |
| 5,450,774 | A * | 9/1995 | Chang | 81/440 |
| 5,791,211 | A * | 8/1998 | Bondhus et al. | 81/440 |
| 6,601,481 | B2 * | 8/2003 | Chuang | 81/440 |
| 7,140,280 | B2 * | 11/2006 | Hawkins et al. | 81/440 |
| 8,359,954 | B2 * | 1/2013 | Johnson et al. | 81/440 |
| 2003/0074738 | A1 * | 4/2003 | Chuang | 7/100 |
| 2005/0268754 | A1 * | 12/2005 | Fa | 81/437 |
| 2008/0086822 | A1 * | 4/2008 | Elsener | 7/118 |
| 2010/0107425 | A1 * | 5/2010 | Bykowski et al. | 30/346.55 |
| 2010/0319501 | A1 * | 12/2010 | Chuang | 81/440 |

* cited by examiner

*Primary Examiner* — Ghassem Alie
(74) *Attorney, Agent, or Firm* — Rosenberg, Klein & Lee

(57) ABSTRACT

A manufacturing process of a foldable repairing tool bit includes a material preparing step, an unnecessary material removing step and a material bending step. Wherein, a stick with a designated length is prepared firstly, where one end of the stick is a bending portion, and another end of the stick is an embodying portion; and then, at least one side of the bending portion is partially removed so as to form a smooth surface thereof; finally, the bending portion are bent so as to form a tool bit with a pivoting hole. Under this arrangement, said tool bits are pivotally assembled in a tool base so as to form a foldable repairing tool set.

6 Claims, 13 Drawing Sheets

MANUFACTURING PROCESS OF A FOLDABLE REPAIRING TOOL BIT

BACKGROUND OF THE INVENTION

1. Field of the Invention

The present invention relates to a manufacturing process, and more particularly to a manufacturing process of a foldable repairing tool bit.

2. Description of Related Art

In order to produce a conventional foldable tool bit, one end of a stick is bent so as to form a pivoting hole, and another end of the stick is machined so as to form an embodying portion. Under this arrangement, said foldable tool bits are pivotally assembled in a tool base so as to form a conventional foldable tool set.

A size of the pivoting hole is uniform for said foldable tool bits with different sizes. When a thickness of the stick is too large, the stick will break easily upon the bending process or even cannot be bent, so that a stability of manufacturing said foldable tool bits becomes worse and a life time of a mold for manufacturing said foldable tool bits becomes shorten. Referring to FIG. 12, which shows a bent stick which is applied in a conventional manufacturing process of conventional foldable tool bit. A center line of the rotating axis of the stick is labeled as $D_0$, while a length of the embodying portion of the stick is labeled as $L_0$. As shown in FIG. 12, a radius of bending increases as the thickness of the conventional stick 10 increases, so that a length of the conventional stick 10 is extended and a cost of said manufacturing process is increased. In addition, a volume and a weight of the conventional stick 10 are both increased as the length of the conventional stick 10 is extended, so that a user cannot carry the conventional foldable tool set easily. Moreover, appearances of said foldable tool bits will not be uniform if said foldable tool bits is made by said conventional manufacturing process.

Another conventional manufacturing process of foldable tool is applied by a forging process so that the foldable tools with uniform appearances are produced. However, the forging process is expensive. In addition, after the forging process, an annealing process must be applied to remove the stress inside the stick which is caused by the forging process and to be compatible with a further flattening process. Under this arrangement, an excess decarburization might occur upon a mass production of said foldable tools after the annealing process so that a mechanical strength of said foldable tool will be weakened. Moreover, parts of the conventional stick 10 where said flattening process is applied to suffer a solidification phenomenon, while these solidified sticks are not suitable in a further cutting process.

Other conventional manufacturing process of foldable tool is applied by a suppressing process where a bending portion of the conventional stick is suppressed before a bending process and a pressing process is applied to remove the unnecessary material so that the foldable tools with uniform appearances are produced. However, after the suppressing process, the bending portion of the conventional stick is solidified, and the bending portion of the conventional stick will break easily upon the bending process or even cannot be bent, so that a stability of manufacturing said foldable tools becomes worse and a life time of a mold for manufacturing said foldable tools becomes shorten. In addition, during the pressing process, when a thickness of the conventional stick is too large, an appearance of a cut plane is unsmooth, so that an appearance of the conventional foldable tool which is made of said stick will not be uniform.

The present invention has arisen to mitigate and/or obviate the disadvantages of the conventional.

SUMMARY OF THE INVENTION

The main objective of the present invention is to provide a manufacturing process.

To achieve the objective, a manufacturing process of a foldable repairing tool bit comprises the following steps:

(a) material preparing step: a stick with designated length is prepared; the stick has an embodying portion formed at one end thereof; the stick has a bending portion formed at another end thereof;

(b) unnecessary material removing step: at least one side of the bending portion is removed via a cutting method to achieve a designated thickness of the bending portion so as to form a machining plane which has a smooth texture on a surface of the bending portion; and (c) material bending step: the bending portion of the stick is bent so as to form a tool bit with a pivoting hole. Wherein in the unnecessary material removing step, the upper part of the bending portion of the stick is partially removed so as to form a machining plane; a connecting plane is formed between the machining plane and the embodying portion; a thickness of the connecting plane is reduced gradually from the embodying portion toward the bending portion; wherein in the material bending step, the bending portion is bent to a bottom part of the bending portion which is opposite to the machining plane so that a terminal end of the bending portion corresponds to the bottom part of the bending portion; in the unnecessary material removing step, the bottom part of the bending portion of the stick is partially removed so as to form a sub machining plane; a sub connecting plane is formed between the sub machining plane and the embodying portion; another thickness of the sub connecting plane is reduced gradually from the embodying portion toward the bending portion; in the material bending step, the bending portion is bent to the sub machining plane so that the terminal end of the bending portion corresponds to the sub machining plane; the present invention further comprises a second unnecessary material removing step; the second unnecessary material removing step is proceeded after the material bending step is finished; wherein an outer part of the bending portion is partially removed so as to form an inferior machining plane; an inferior connecting plane is formed between the inferior machining plane and the embodying portion; a inferior thickness of the inferior connecting plane is reduced gradually from the embodying portion of the stick toward the bending portion of the stick; wherein in the unnecessary material removing step, the upper part of the bending portion of the stick and the bottom part of the bending portion of the stick are partially removed simultaneously so as to form the machining plane and the sub machining plane respectively; the connecting plane is formed between the machining plane and the embodying portion; the sub connecting plane is formed between the sub machining plane and the embodying portion; the thickness of the connecting plane is reduced gradually from the embodying portion toward the bending portion; another thickness of the sub connecting plane is reduced gradually from the embodying portion toward the bending portion; in the material bending step, the bending portion is bent to the sub machining plane; the designated thickness of the bending portion of the stick is smaller than another designated thickness of the embodying portion of stick; the present invention further comprises an embodying portion machining step; the embodying portion machining step is selectively progressed between the material preparing step and the unnecessary material removing step, the unnecessary material removing step and the material bending step and progressed after the material bending step; the embodying portion machining step is achieved by another cutting method.

Further benefits and advantages of the present invention will become apparent after a careful reading of the detailed description with appropriate reference to the accompanying drawings.

DETAILED DESCRIPTION OF THE INVENTION

Referring to FIGS. 1-4, a manufacturing process of a foldable repairing tool bit in accordance with a main embodiment of the present invention comprises the following steps:

(a) Material preparing step: A stick 1 with designated length is prepared (In the present invention, a shape of a cross-sectional area of the stick 1 could be hexagon; however, the shape of the cross-sectional area of the stick 1 is not limited by the present invention.). The stick 1 has an embodying portion 11 formed at one end thereof. The stick 1 has a bending portion 12 formed at another end thereof.

(b) Unnecessary material removing step: At least one side of the bending portion 12 is removed via a cutting method to achieve a designated thickness of the bending portion 12 so as to form a machining plane 121 which has a smooth texture on a surface of the bending portion 12.

(c) Material bending step: The bending portion 12 of the stick 1 is bent so as to form a tool bit (not numbered) with a pivoting hole (not numbered).

Figure 1:
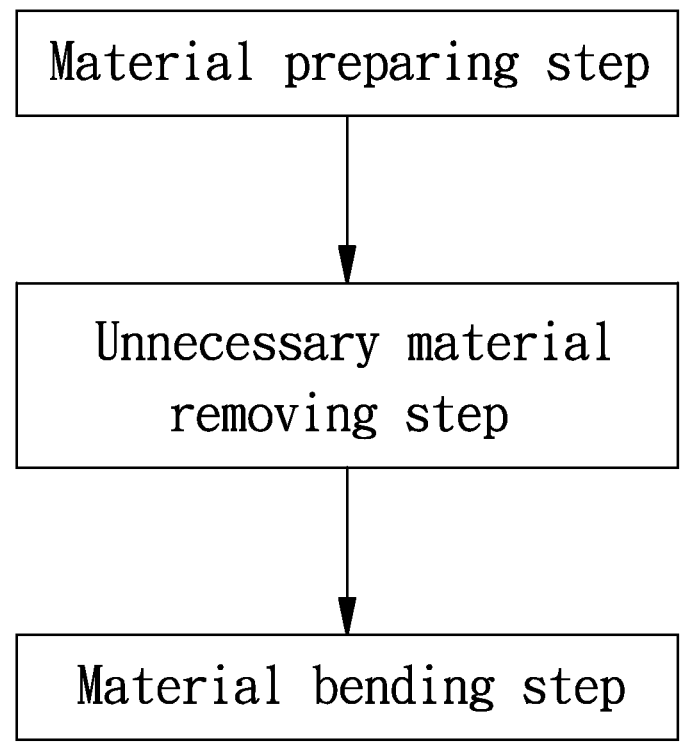
FIG. 1 is a flow chart of a manufacturing process of a foldable repairing tool bit of a main embodiment of the present invention.
Figure 2:
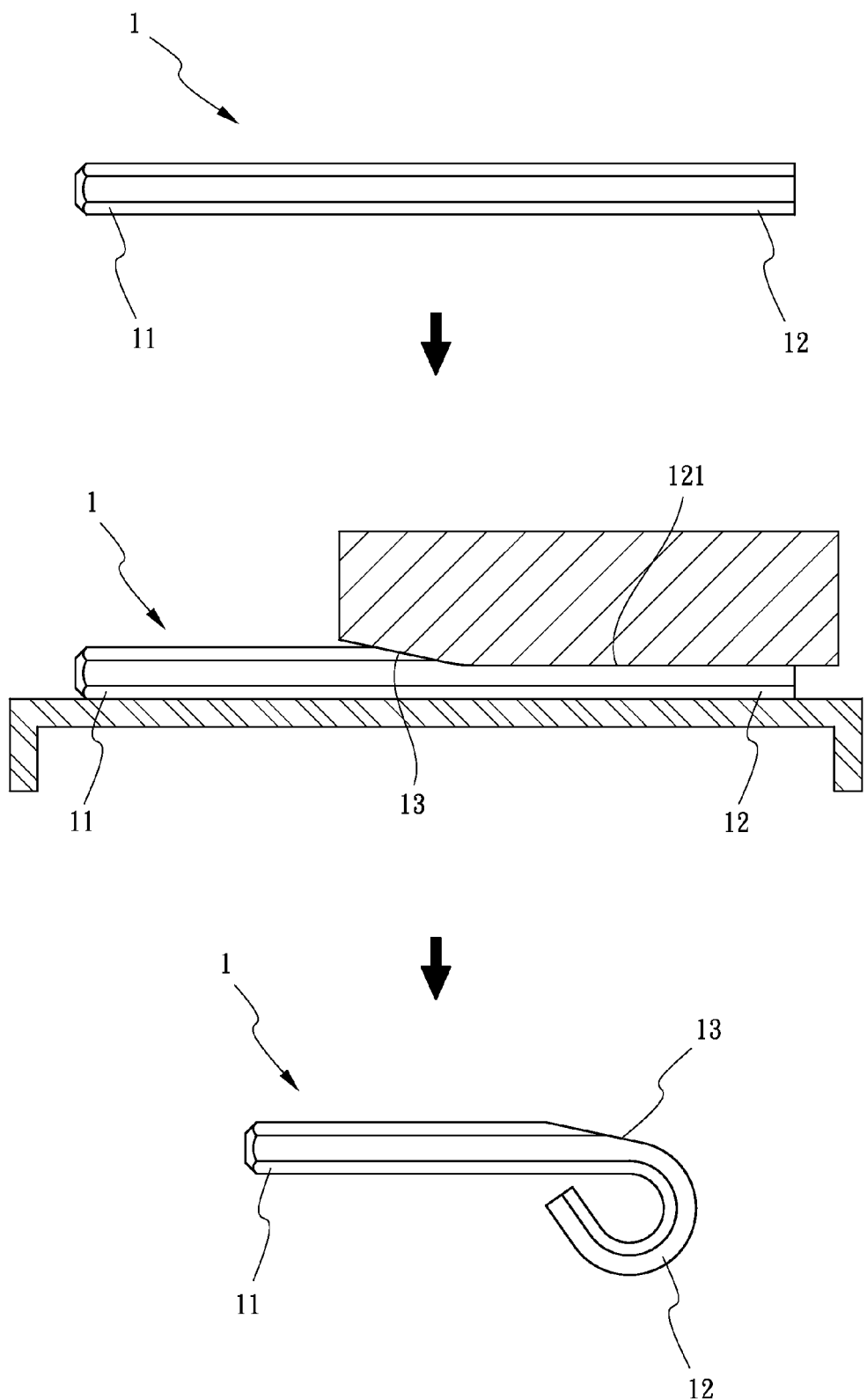
FIG. 2 is a machining sketch chart of the main embodiment of the present invention for showing an upper part of a stick is machining.
Figure 3:
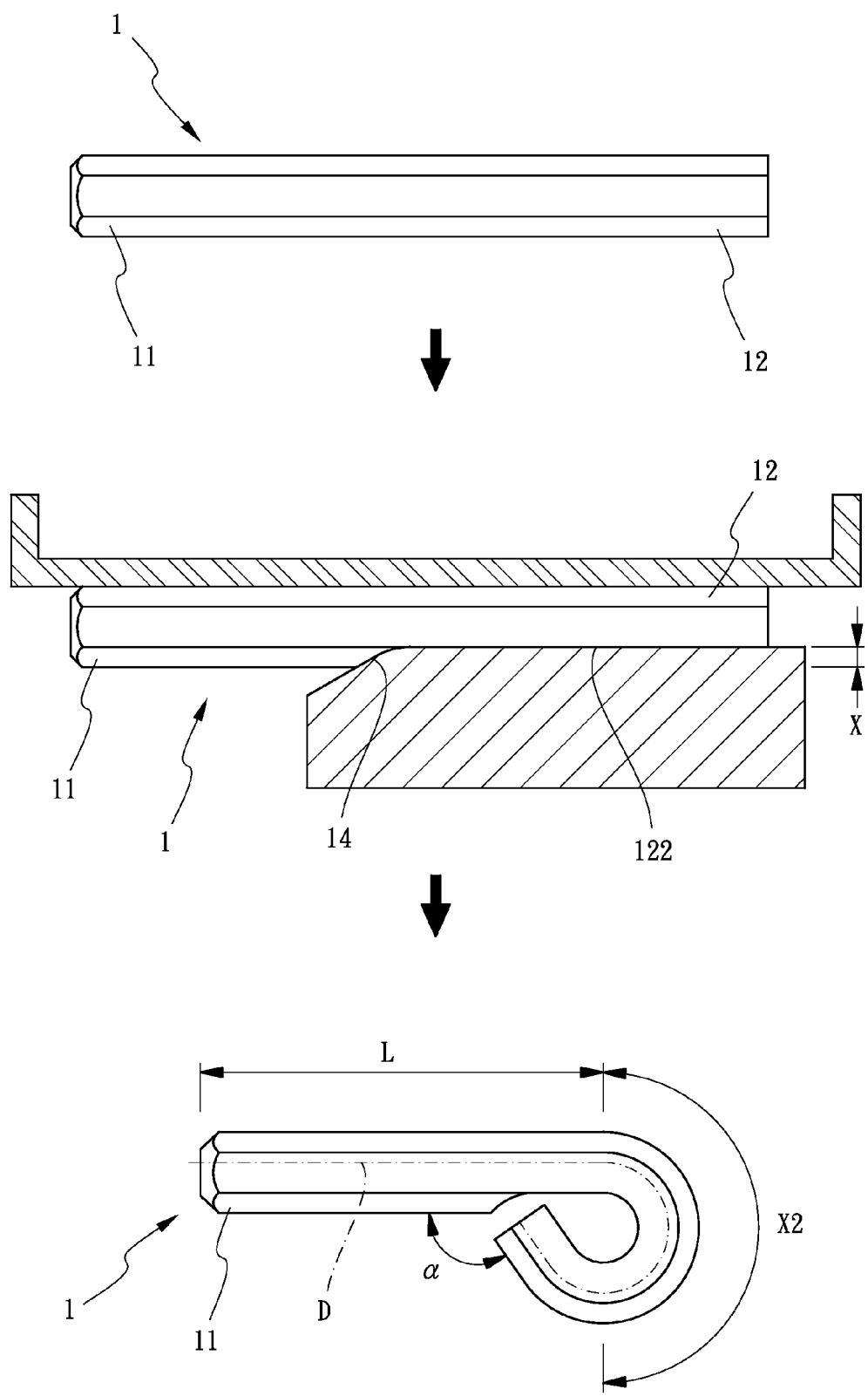
FIG. 3 is a machining sketch chart of the main embodiment of the present invention for showing a bottom part of the stick is machining.
Figure 4:
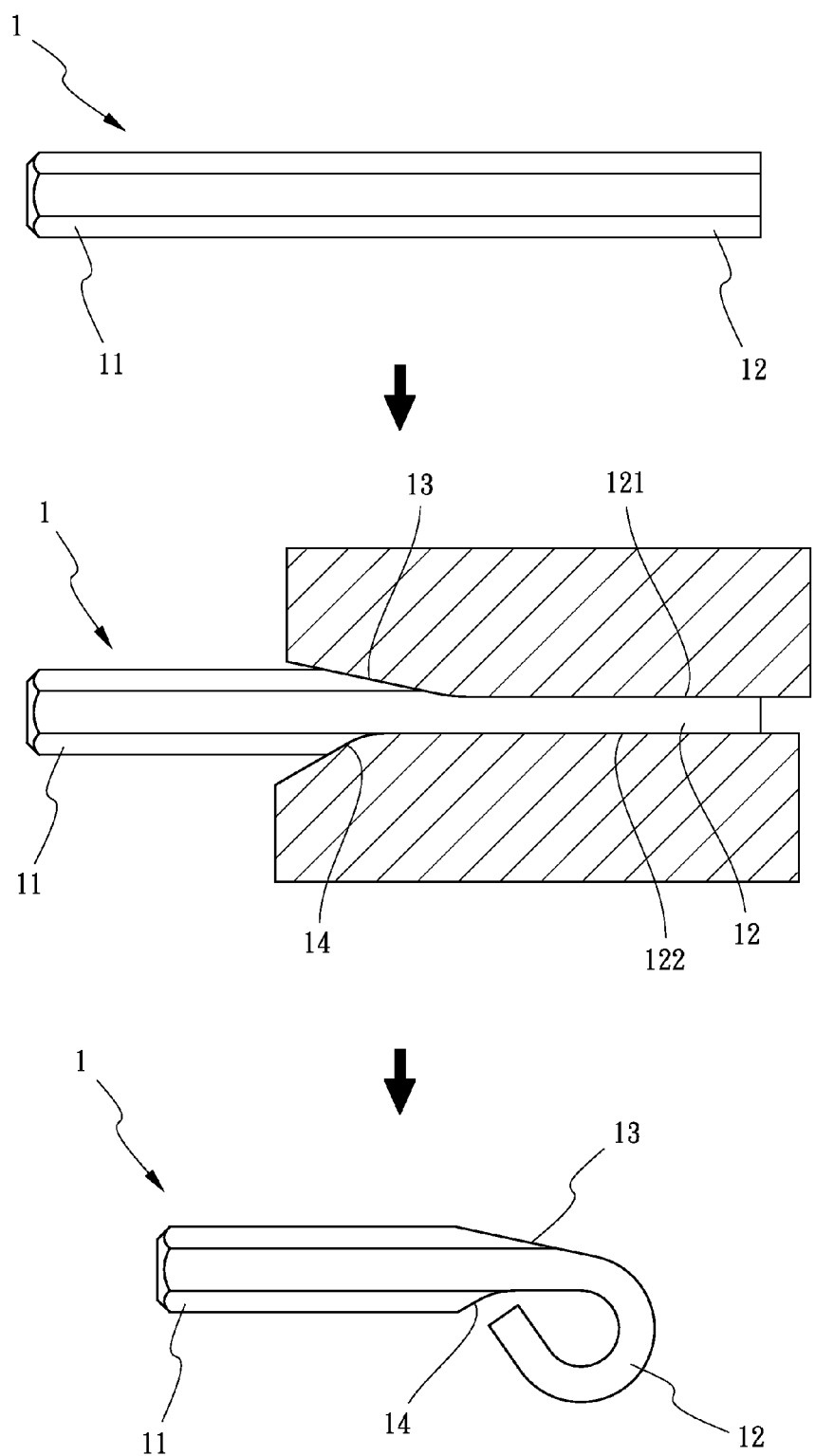
FIG. 4 is a machining sketch chart of the main embodiment of the present invention for showing both the upper part of the stick and the bottom part of the stick are machining.

Referring to FIGS. 2-4, the unnecessary material removing step further comprises the following.

1. Machining on an Upper Part of the Stick 1:

The upper part of the bending portion 12 of the stick 1 is partially removed so as to form a machining plane 121. A connecting plane 13 is formed between the machining plane 121 and the embodying portion 11. A thickness of the connecting plane 13 is reduced gradually from the embodying portion 11 toward the bending portion 12. In the material bending step, the bending portion 12 is bent to a bottom part of the bending portion 12 which is opposite to the machining plane 121 so that a terminal end of the bending portion 12 corresponds to the bottom part of the bending portion 12.

2. Machining on the Bottom Part of the Stick 1:

The bottom part of the bending portion 12 of the stick 1 is partially removed so as to form a sub machining plane 122. A sub connecting plane 14 is formed between the sub machining plane 122 and the embodying portion 11. Another thickness of the sub connecting plane 14 is reduced gradually from the embodying portion 11 toward the bending portion 12. In the material bending step, the bending portion 12 is bent to the sub machining plane 122 so that the terminal end of the bending portion 12 corresponds to the sub machining plane 122.

3. Machining on Dual Sides of the Stick 1:

The upper part of the bending portion 12 of the stick 1 and the bottom part of the bending portion 12 of the stick 1 are partially removed simultaneously so as to form the machining plane 121 and the sub machining plane 122 respectively. The connecting plane 13 is formed between the machining plane 121 and the embodying portion 11. The sub connecting plane 14 is formed between the sub machining plane 122 and the embodying portion 11. The thickness of the connecting plane 13 is reduced gradually from the embodying portion 11 toward the bending portion 12. Another thickness of the sub connecting plane 14 is reduced gradually from the embodying portion 11 toward the bending portion 12. In the material bending step, the bending portion 12 is bent to the sub machining plane 122. Referring to FIG. 4, an inclined level of the connecting plane 13 relative to the surface of the stick 1 is different from a sub inclined level of the sub connecting plane 14 relative to said surface so that the connecting plane 13 and the sub connecting plane 14 can be distinguished from each other easily.

The advantages of applying said machining methods are described as following.

1. In the case of "Machining on an upper part of the stick 1": The surface of the bending portion 12 is smooth even after the bending portion 12 of the stick 1 is bent to produce the tool bit. In addition, the appearance of the bending portion 12 for each foldable tool bit is uniform.

2. In the case of "Machining on a bottom part of the stick 1": when a length of the stick 1 (L) is equal to another length of a conventional stick 1 ($L_0$), a distance between a central line of bending portion 12 of the stick 1 and a bottom plane of the stick 1 (D) is shorter than another distance between another central line of bending portion 12 of the conventional stick 10 and the bottom of the conventional stick 10 ($D_0$). Therefore, when an angle ($\alpha$) between the terminal of the bending portion 12 of the stick 1 and the embodying portion 11 of the stick 1 is equal to another angle ($\alpha_0$) between the terminal of the bending portion 12 of the conventional stick 10 and the embodying portion 11 of the conventional stick 10, the length of the stick 1 (L) would be shorter than another length of the conventional stick 10 ($L_0$) so that a cost and a quantity of the stick material are saved. In fact, referring to FIG. 3, when the inclined angle of said connecting plane 13 goes bigger, a removing depth of the stick 1 (X) goes deeper, and a total length for bending (X2) goes shorter. Besides, after the machining step, the appearances of the bending portion 12 for the tool bits are uniform when said tool bits are kept in a tool base (shown in FIG. 14, not numbered) which form a foldable repairing tool set with said tool bits, so that a storing space of said foldable repairing tool set is saved and a weight of said foldable repairing tool set is reduced.

3. In the case of "Machining on the dual sides of the stick 1": The upper part of the bending portion 12 and the bottom part of the bending portion 12 are partially removed at the same time, so that a time of manufacturing said tool bits is reduced.

Figure 5:
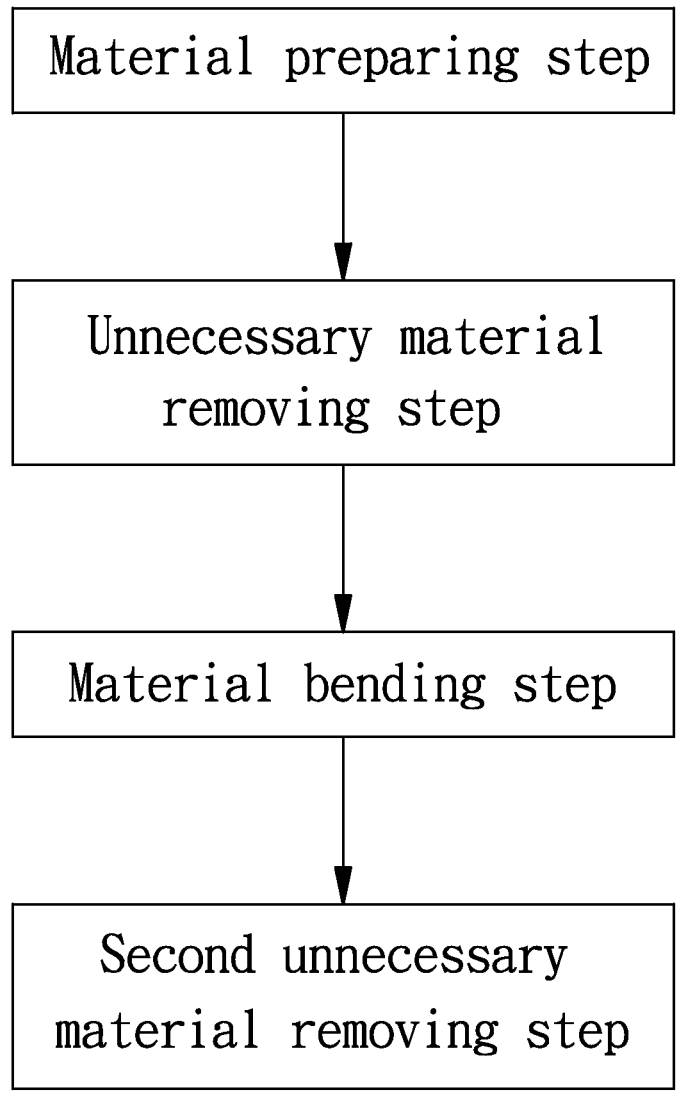
FIG. 5 is a flow chart of a manufacturing process of a foldable repairing tool bit of another embodiment of the present invention.
Figure 6:
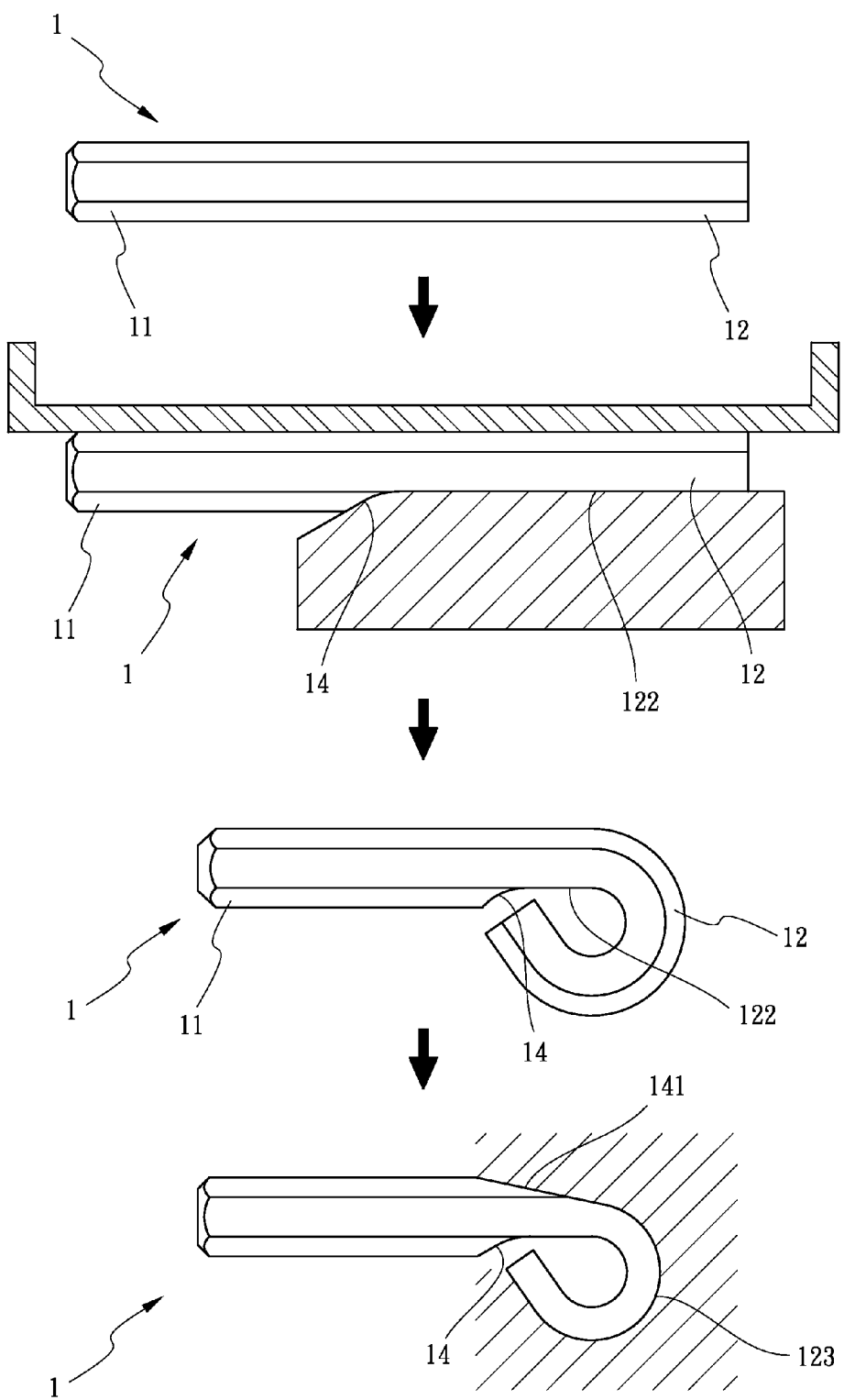
FIG. 6 is a machining sketch chart of another embodiment of the present invention for showing a stick is machining.
Figure 7:
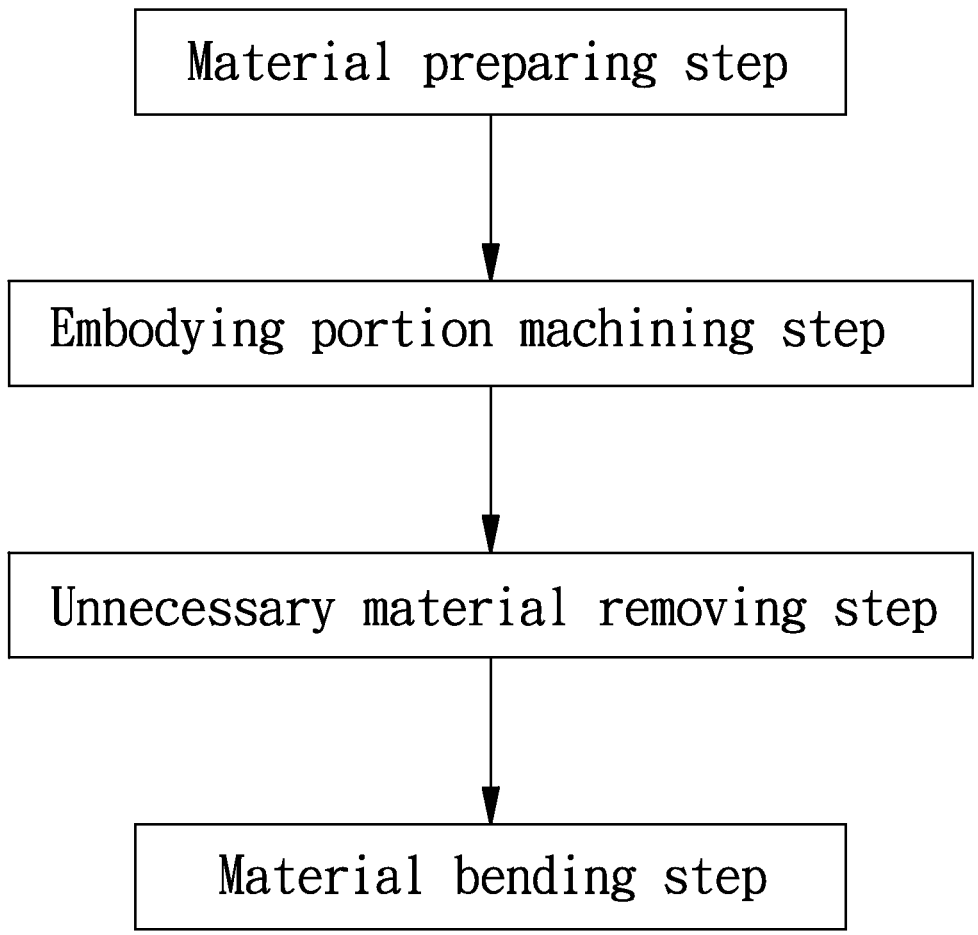
FIG. 7 is a machining sketch chart for showing an embodying portion machining step is involved between the material preparing step and the unnecessary material removing step.
Figure 8:
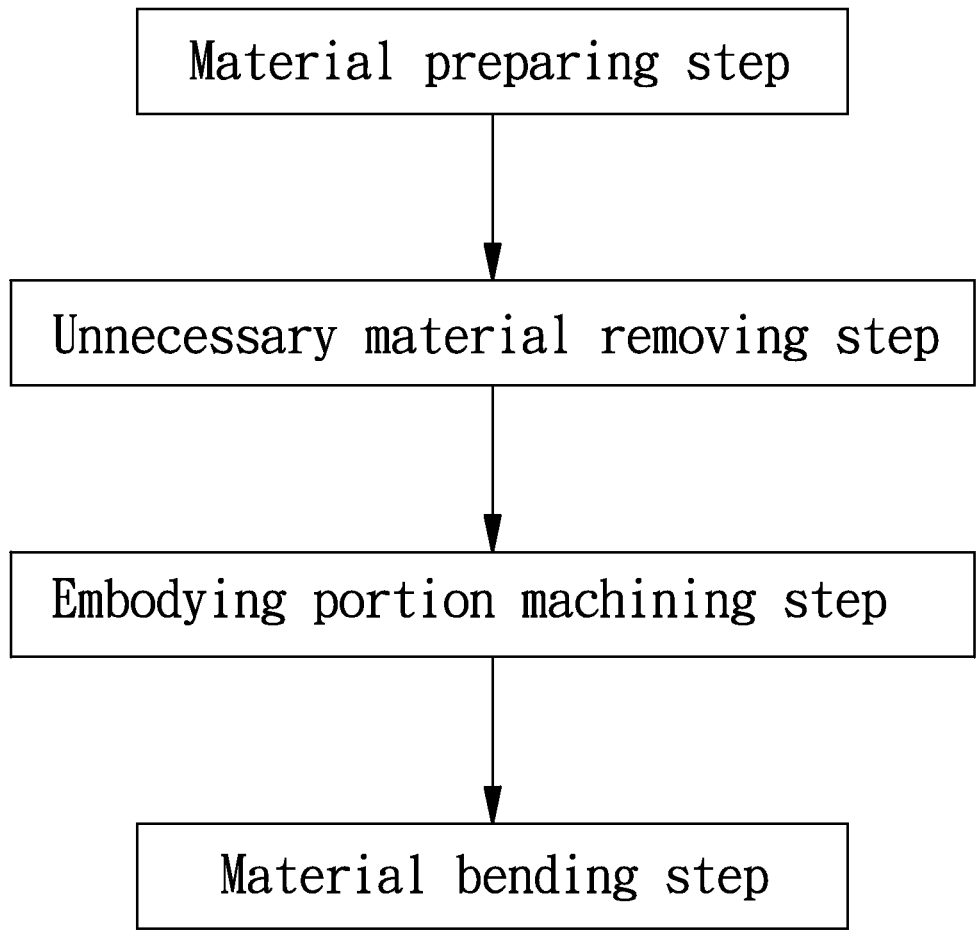
FIG. 8 is a machining sketch chart for showing the embodying portion machining step is involved between the unnecessary material removing step and the material bending step.
Figure 9:
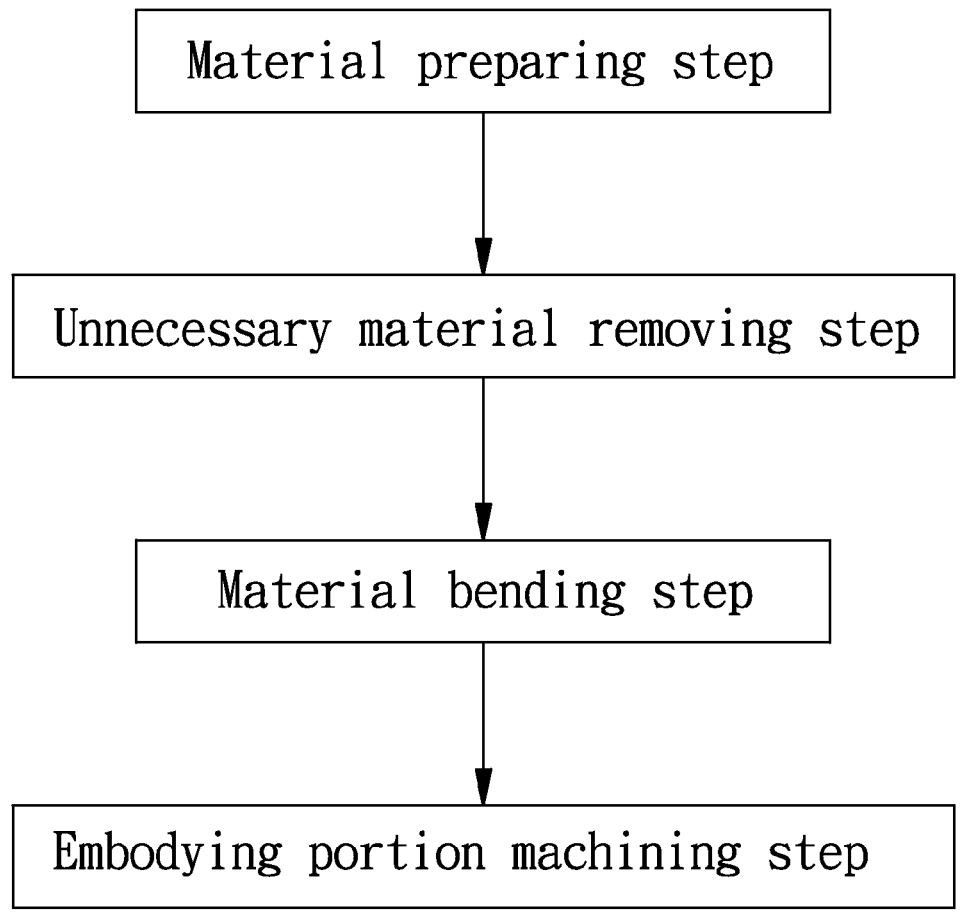
FIG. 9 is a machining sketch chart for showing the embodying portion machining step is involved after the material bending step.
Figure 10:
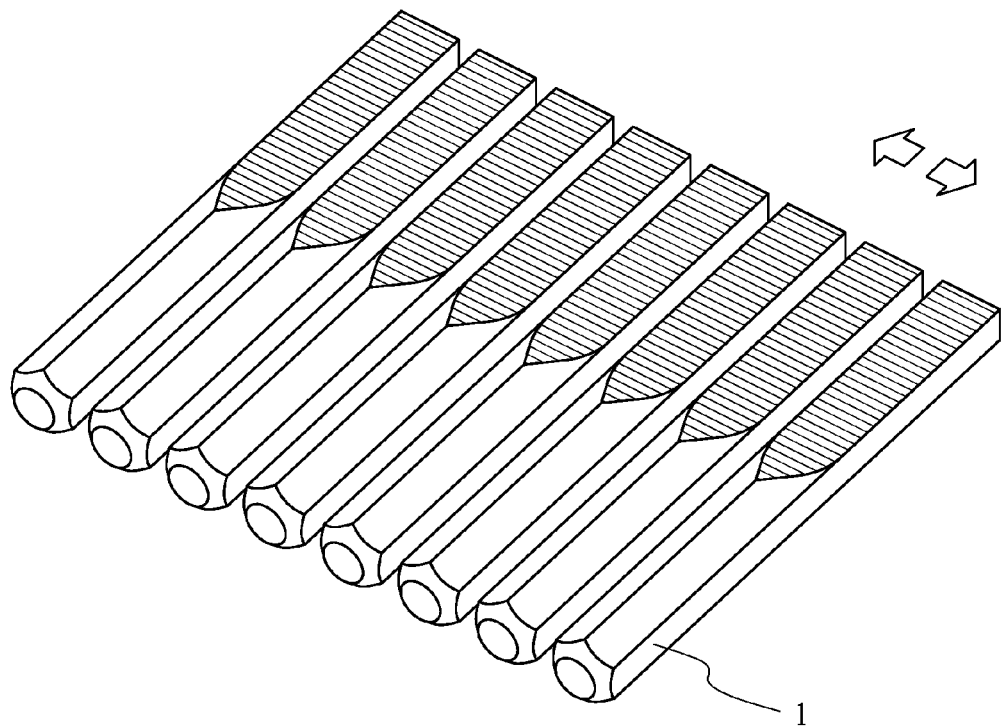
FIG. 10 is a schematic view of a first cutting process for applying to a plurality of sticks of the present invention.
Figure 11:
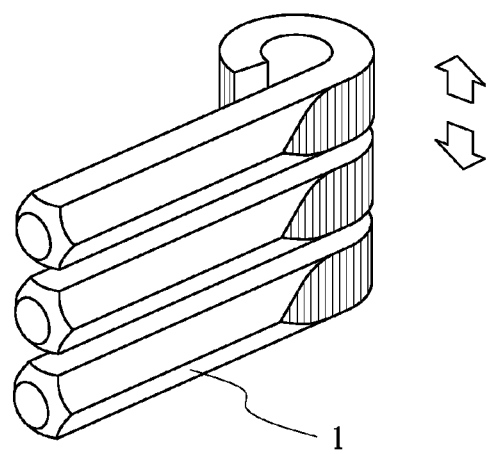
FIG. 11 is a schematic view of a second cutting process for applying to a plurality of sticks of the present invention.
Figure 12:
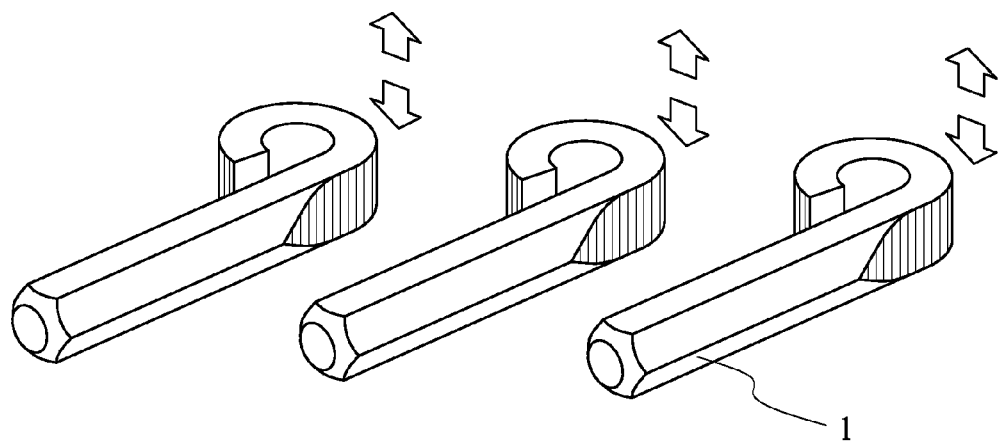
FIG. 12 is a schematic view of a third cutting process for applying to a plurality of sticks of the present invention.
Figure 13:
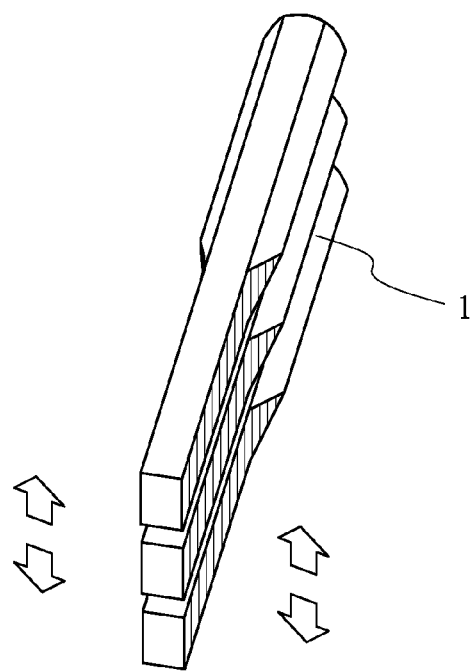
FIG. 13 is a schematic view of a fourth cutting process for applying to a plurality of sticks of the present invention.

Referring to FIGS. 5-6, the present invention further comprises a second unnecessary material removing step. The second unnecessary material removing step is proceeded after the material bending step is finished. Under this arrangement, an outer part of the bending portion 12 is partially removed so as to form an inferior machining plane 123. An inferior connecting plane 141 is formed between the inferior machining plane 123 and the embodying portion 11. A inferior thickness of the inferior connecting plane 141 is reduced gradually from the embodying portion 11 of the stick 1 toward the bending portion 12 of the stick 1 so as to form a smooth surface on the bending portion 12.

In the present invention, the designated thickness of the bending portion 12 of the stick 1 is smaller than another designated thickness of the embodying portion 11 of stick 1, so that the sticks 1 could be received into the tool base completely even if the thicknesses of sticks 1 are different from each other.

The present invention further comprises an embodying portion machining step. The embodying portion machining step is selectively progressed between the material preparing step and the unnecessary material removing step, the unnecessary material removing step and the material bending step and progressed after the material bending step. The embodying portion machining step is achieved by another cutting method. Therefore, the embodying portions 11 of the sticks 1 are further processed as different shapes for various applications.

In the present invention, the unnecessary material removing step is achieved by removing at least one side of the bending portion 12 via the other cutting method so as to achieve a designated thickness of the bending portion 12 (said cutting method for the bending portion 12 is not limited by the present invention.). Referring to FIGS. 10-13, when one stick 1 or more than one sticks 1 are aligned parallel by a clamping means (not shown), different cutting tools (not shown) are applied transversally or longitudinally to said sticks 1. Under this arrangement, a mass production of said tool bits is achieved by replacing the cutting tools and changing alignments of the sticks 1 so that the sticks 1 is selectively cut by a one side cutting method or by a dual sides cutting method. In addition, the second unnecessary material removing step is achieved by partially removing an outer part of the bending portion 12 via a multi-orientational broaching method (not shown) so that the outer parts of the bending portions 12 of the sticks 1 can be partially removed at the same time.

Figure 14:
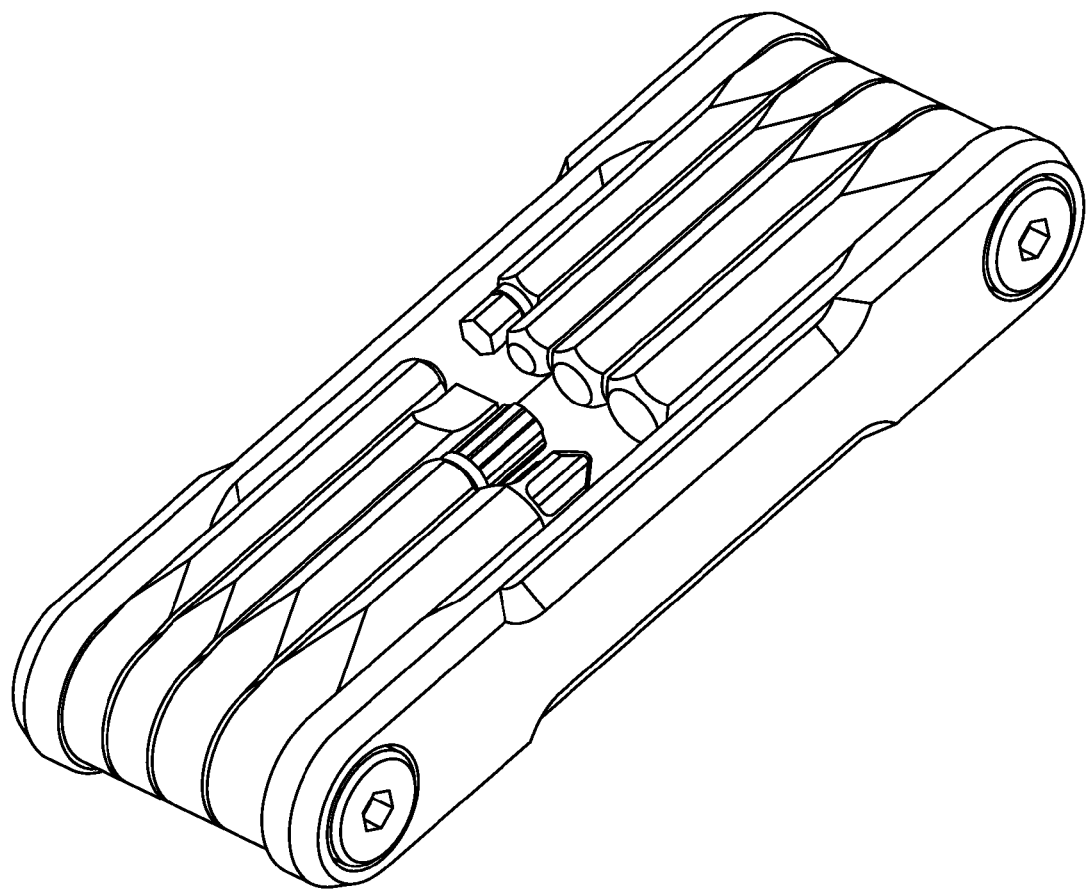
FIG. 14 is a perspective view of a foldable repairing tool set.
Figure 15:
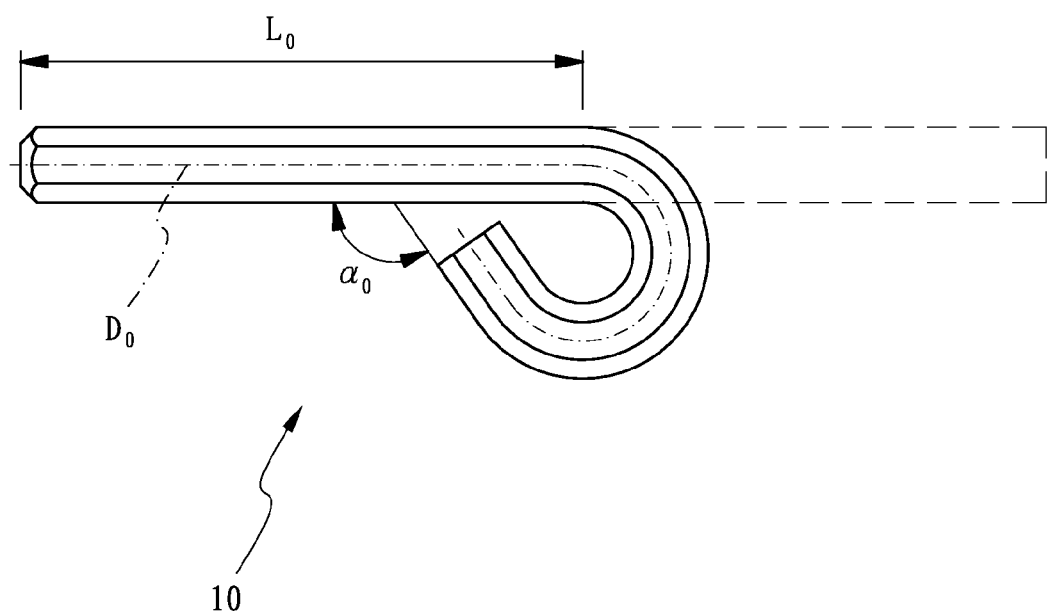
FIG. 15 is a schematic view of a manufacturing process of a conventional foldable repairing tool bit.

All in all, the present invention has following advantages:
1. Referring to FIG. 14, after the unnecessary material removing step is finished, the bending portion 12 of the stick 1 is bent to produce the tool bit, and a surface of the outer part of the bending portion 12 is smooth so that the appearances of the bending portion 12 for the tool bits are uniform when said tool bits are kept in the tool base.

2. Since the unnecessary material removing step is applied via the cutting method, the cost of the stick materials can be reduced. Moreover, as compared to a forging method or a pressing method which is involved in a conventional machining step, the cutting method would not break an inner structure of the stick 1 easily, so that a yield rate of the tool bit is higher than another yield rate of the conventional tool bit.

3. By applying different cutting methods in the unnecessary material removing step, a target of the mass production of the tool bits is achieved.

4. By simplifying the manufacturing process of the tool bits, a time for producing said tool bits is reduced.

Although the invention has been explained in relation to its preferred embodiment, it is to be understood that many other possible modifications and variations can be made without departing from the spirit and scope of the invention as hereinafter claimed.

What is claimed is:

1. A manufacturing process of a foldable repairing tool bit comprising the following steps:
    (a) material preparing step: a stick with designated length is prepared; the stick has an embodying portion formed at one end thereof; the stick has a bending portion formed at another end thereof;
    (b) unnecessary material removing step: at least one side of the bending portion is removed via a cutting method to achieve a designated thickness of the bending portion so as to form a machining plane which has a smooth texture on a surface of the bending portion, the upper part of the bending portion of the stick is partially removed so as to form a machining plane, a connecting plane is formed between the machining plane and the embodying portion and a thickness of the connecting plane is reduced gradually from the embodying portion toward the bending portion; and
    (c) material bending step: the bending portion of the stick is bent so as to form a tool bit with a pivoting hole, the bending portion is bent to a bottom part of the bending portion which is opposite to the machining plane so that a terminal end of the bending portion corresponds to the bottom part of the bending portion.

2. The manufacturing process of a foldable repairing tool bit as claimed in claim 1, wherein in the unnecessary material removing step, the bottom part of the bending portion of the stick is partially removed so as to form a sub machining plane; a sub connecting plane is formed between the sub machining plane and the embodying portion; another thickness of the sub connecting plane is reduced gradually from the embodying portion toward the bending portion; in the material bending step, the bending portion is bent to the sub machining plane so that the terminal end of the bending portion corresponds to the sub machining plane.

3. The manufacturing process of a foldable repairing tool bit as claimed in claim 2, wherein the manufacturing process further comprises a second unnecessary material removing step; the second unnecessary material removing step is proceeded after the material bending step is finished; wherein an outer part of the bending portion is partially removed so as to form an inferior machining plane; an inferior connecting plane is formed between the inferior machining plane and the embodying portion; a inferior thickness of the inferior connecting plane is reduced gradually from the embodying portion of the stick toward the bending portion of the stick.

4. The manufacturing process of a foldable repairing tool bit as claimed in claim 1, wherein the designated thickness of the bending portion of the stick is smaller than another designated thickness of the embodying portion of stick.

5. The manufacturing process of a foldable repairing tool bit as claimed in claim 1, wherein the manufacturing process further comprises an embodying portion machining step; the embodying portion machining step is selectively progressed between the material preparing step and the unnecessary material removing step, the unnecessary material removing step and the material bending step and progressed after the material bending step; the embodying portion machining step is achieved by another cutting method.

6. The manufacturing process of a foldable repairing tool bit as claimed in claim 4, wherein the manufacturing process further comprises an embodying portion machining step; the embodying portion machining step is selectively progressed between the material preparing step and the unnecessary material removing step, the unnecessary material removing step and the material bending step and progressed after the material bending step; the embodying portion machining step is achieved by another cutting method.

* * * * *